United States Patent [19]

Nard et al.

[11] 3,774,211

[45] Nov. 20, 1973

[54] METHOD OF AND APPARATUS FOR TRANSMITTING PHASE CONNECTIONS, IN PARTICULAR FOR THE OMEGA RADIO NAVIGATION-SYSTEM

[75] Inventors: Georges Nard; Gerard Millot, both of Nantes; Christian Lamiraux, St. Sebastian, Loire, all of France

[73] Assignee: Societe D'Etudes, Recherches Et Constructions Electronique Sercel, Carquefou, France

[22] Filed: July 27, 1972

[21] Appl. No.: 275,586

[30] Foreign Application Priority Data

Apr. 20, 1972 France .............................. 7214056

[52] U.S. Cl. ......... 343/105 R, 343/103, 343/105 R, 343/112 D

[51] Int. Cl. ............................................... G01s 1/30

[58] Field of Search .................... 343/105 R, 112 D, 343/103

[56] References Cited

UNITED STATES PATENTS 3,715,758 2/1973 Sender ........................... 343/105 R

*Primary Examiner*—Benjamin A. Borchelt
*Assistant Examiner*—Richard E. Berger
*Attorney*—Alan H. Levine

[57] ABSTRACT

In a sequential-transmission phase measurement radionavigation system, such as the OMEGA radionavigation system, phase correction signals are transmitted by a network of transmitting stations to provide phase corrections over a predetermined area. Each phase correction transmitting station compares the measured phases with preset theoretical phases and provides a phase correction signal for each measured phase. The phase correction signals are time multiplexed with a multiplex frequency between 10 and 30 times the repetition rate of each of the sequential transmissions of the radio-navigation system, the multiplexing being synchronous with the sequential transmissions. The multiplexed signal is phase modulated on a carrier with a low modulation index. At a receiver the multiplexed phase correction signal is demodulated and demultiplexed to provide the phase correction signals which are used to modify the measured phases at the receiver.

17 Claims, 6 Drawing Figures

METHOD OF AND APPARATUS FOR TRANSMITTING PHASE CONNECTIONS, IN PARTICULAR FOR THE OMEGA RADIO NAVIGATION-SYSTEM

The present invention relates to radionavigation by measurements of phase. It relates more particularly to radionavigation systems in which the waves which are the subject of phase measurements are transmitted sequentially, in particular when the frequencies of these waves are situated in the range of very low radioelectric frequencies.

In the present patent application, by "sequentially transmitted waves" it is meant that transmissions of different origin are made successively in time in accordance with a predetermined sequence for a given radionavigation system.

It is known that the operation of radionavigation systems by phase measurements is effected by assuming that the true propagation of electromagnetic waves is assimilable to their propagation in a vacuum. It is assumed, in particular, that the speed of propagation of electromagnetic waves is constant at a given frequency.

In fact, this assumption is not strictly verified in practice. The phenomenon known by the name of sky waves and due essentially to reflections in the layers of the ionosphere is the main cause of the differences or divergences that are found.

Attempts have been made to forecast by mathematical calculation the differences that are due to sky waves. Tables of corrections are published by the U.S. NAVAL OCEANOGRAPHIC OFFICE for the OMEGA radionavigation system.

However, the use of these tables of corrections is not fully satisfactory. In fact, fixed-point phase measurements show that there are residual differences after such a correction in accordance with a mathematical forecast of the sky wave. It has been found that these differences have a random component which escapes all forecast by calculation.

Tests made for the OMEGA system have shown that the random differences or divergences observed at two rather close points (distance of the order of several hundred kilometres) are not independent, but, on the contrary, are correlated.

Research has therefore been undertaken for utilizing this correlation by applying to the phase measurements carried out on a mobile radionavigation receiver phase corrections which have been developed from other phase measurements carried out on a receiver positioned in a sufficiently close fixed place.

In the case of the OMEGA radionavigation system, this mode of operation is commonly called differential OMEGA. In the course of the present patent application, the words "differential mode of operation" and "differential radionavigation system" will be used more generally for any system of radionavigation by phase measurements, whether this be of the hyperbolic type, the circular type or other types.

At the present time, there is no apparatus in existence permitting differential operation of radionavigation systems on an industrial scale, because no equipment permitting automatic operation in real time which is simple, reliable and cheap for the user has yet been proposed.

The present invention relates to a method and apparatus enabling corrections to be transmitted for a differential radionavigation system and lending themselves well to industrial use.

An essential object of the invention is to provide operation of a radionavigation system in differential mode by means of relatively simple and economic equipment, while permitting a considerable improvement in the accuracy of determination of position.

Another object of the invention is to achieve a transmission of phase corrections automatically and in real time, using a frequency band which is as narrow as possible.

Another object of the invention is to provide a transmission of this kind which is particularly reliable and insensitive, in particular, to the usual hazards of the transmission of information by radioelectricity.

Another important object of the invention is to permit the operation in differential mode of a radionavigation system with sufficient precision for serving as an aid to navigation in the vicinity of the coasts, in particular with the OMEGA system.

The differential mode of operation according to the invention is achieved starting from the basic structures of a sequential transmission radionavigation system comprising a plurality of transmitting stations and mobile receivers capable of supplying electric signals representing the phase on reception of waves transmitted sequentially by transmitting stations of the said plurality.

According to a differential mode of operation in general, phase measurements are effected at a fixed point on waves of the radionavigation system; (the fixity of this point is relative to the geographical area serving as a reference for the users of the radionavigation system). Starting from these phase measurements, phase corrections are developed taking account of the position of the fixed point with respect to this geographical area, and these corrections are transmitted, in general by radioelectric methods, through at least part of the geographical area.

Each receiver effects phase measurements in conventional manner and moreover receives the phase corrections associated with the measurements which it effects in order to apply these phase corrections to the respectively associated phase measurements.

More precisely, the invention relates to a method of transmitting phase corrections for a sequential-transmission system of radionavigation by phase measurements, wherein at the level of the station transmitting corrections there are effected the operations consisting in producing a multiplex signal of corrections of phase, the frequency of which is between 10 and 30 times the repetition rate associated with the average duration of the individual transmissions of the radionavigation system, and the phase of which is in the same linear relation with the said phase corrections in succession, in accordance with a multiplexing of these phase corrections which is synchronous with the sequence of the transmissions respectively associated with the radionavigation system, and in modulating a carrier wave by means of the multiplex signal of corrections of phase, and wherein at the level of the conventional receiver there are effected the operations consisting in receiving and demodulating the said carrier wave and in demultiplexing the multiplex signal of corrections of phase, in a manner synchronous with the sequence of reception of the associated transmissions by the said conventional receiver.

In this way there are obtained separate correction signals similarly modulated in phase in accordance with the respective corrections to be applied. A synchronous detection of these separate correction signals, which is advantageously associated with an integration filtering, supplies continuous signals representing the phase corrections to be applied.

According to an important aspect of the invention, the modulation of the carrier wave is a low-index phase modulation which preferably comprises:

the production of a first and a second sinusoidal signal the frequency of which is equal to one eighth of that of the said carrier wave, the second signal being displaced in phase by a quarter of a period with respect to the first, the multiplication in amplitude of the second of these signals by the multiplex modulation signal, the weighted addition of the unmodulated first signal to the modulated second signal, the ratio of the maximum amplitudes of the second to the first being of the order of 0.1, the multiplication by 8 of the frequency of the signal obtained after this weighted addition.

This supplies a carrier wave at the frequency F*o*, modulated in phase by the multiplex signal of corrections of phase, which comprises, for each multiplexing segment, a low-frequency signal likewise modulated in phase in accordance with the phase correction associated with the transmission of the radionavigation system corresponding to the same segment, the phase modulation being similar for all the modulation segments, that is to say the phase reference and the degree of modulation are identical.

The invention also relates to a modulating coding circuit for a correction transmitting station, and to a receiver for corrections.

Very advantageously, the transmission of corrections according to the invention is utilized for also correcting the phase of a very stable oscillator located at the level of the conventional receiver with respect to the phase of a very stable oscillator located at the level of the correction transmitting station, in order to permit a differential mode of radionavigation in a circular radionavigation system.

The invention also relates to a method of transmitting corrections utilizing a plurality of correction transmitting stations in which the frequency of the multiplex signal of corrections of phase is the same, at least for all the transmitting stations transmitting phase corrections associated with the same transmissions of the radionavigation system, while the frequencies of the carrier waves differ from one another by the same value between 5 and 10 times the said frequency of the multiplex signal of corrections of phase.

Under these conditions, the receiver for the phase corrections is arranged to receive selectively one of the said carrier waves, the processing of the multiplex signal of corrections of phase restored after demodulation remaining the same whatever the transmitting station chosen in this receiver.

Other characteristics and advanages of the invention will appear on reading the following detailed description given with reference to the drawings, which are given by way of non-limitative example and in which.

Figure 1:
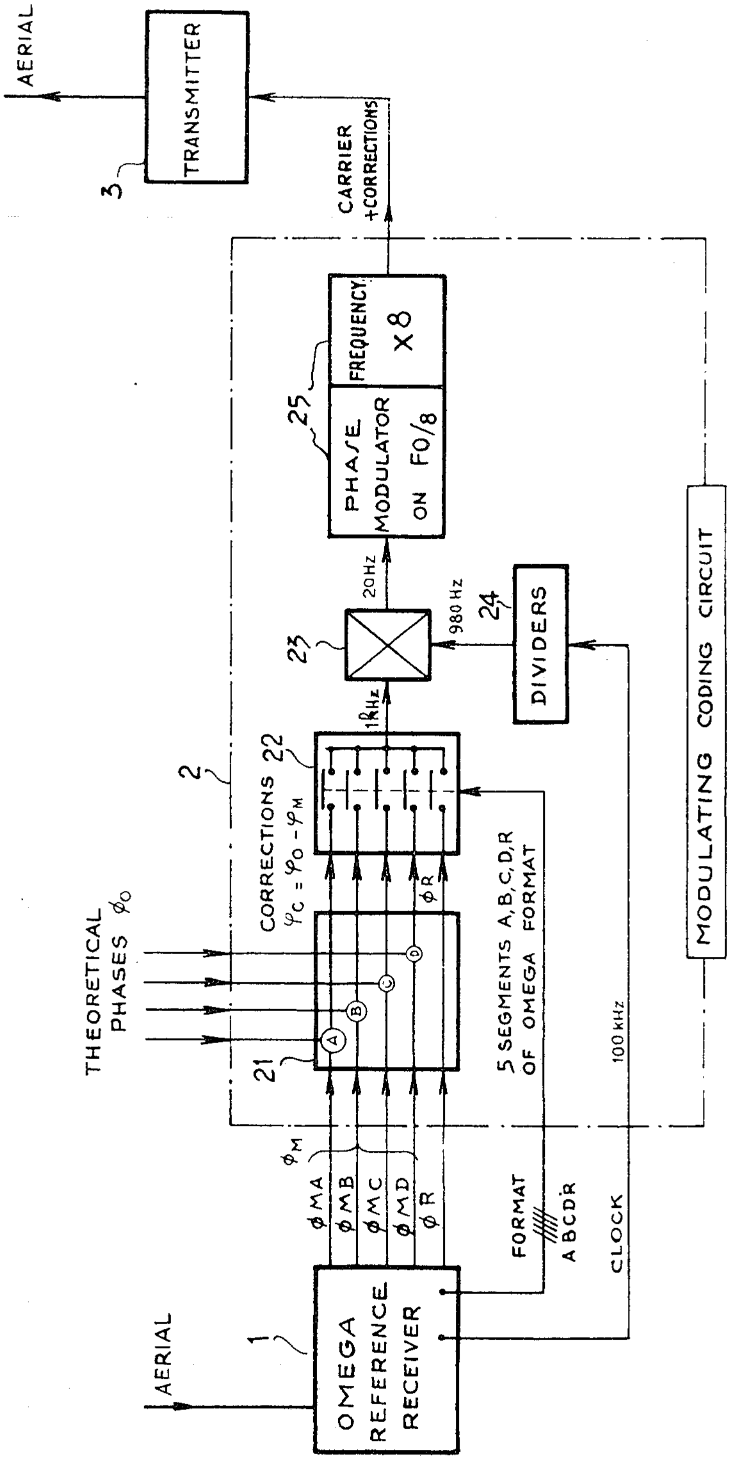
FIG. 1 is a general circuit diagram of a correction transmitting apparatus associated with a receiver of the radionavigation system to form a correction transmitting station.
Figure 6:
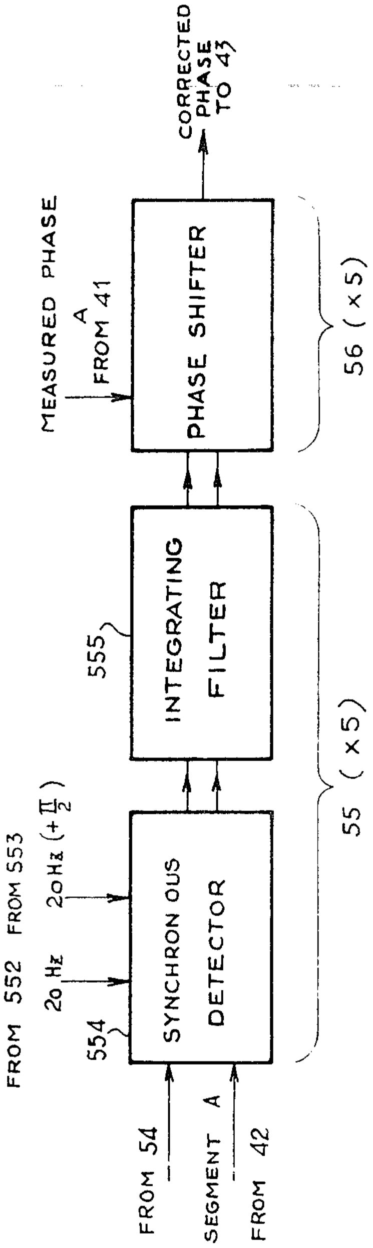
Figure 3:
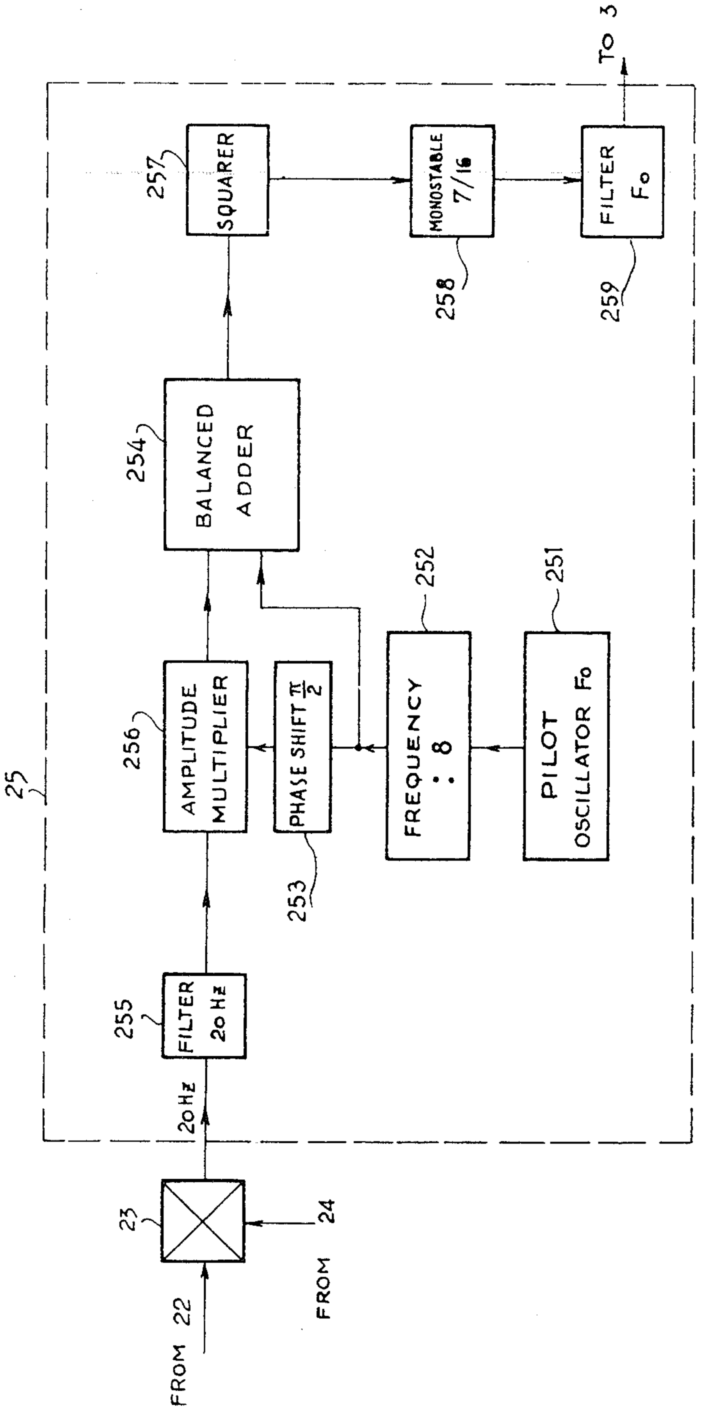
Figure 4:
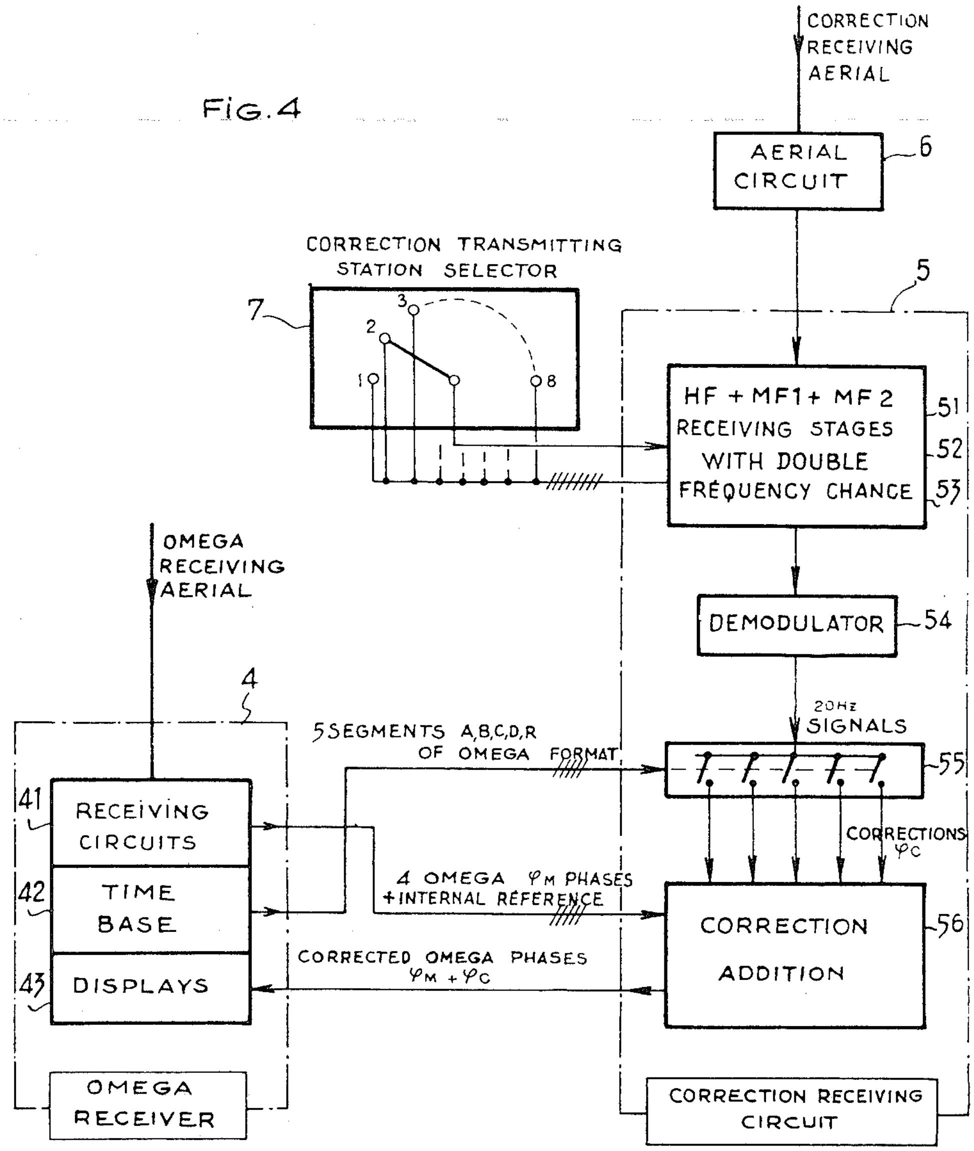
Figure 5:
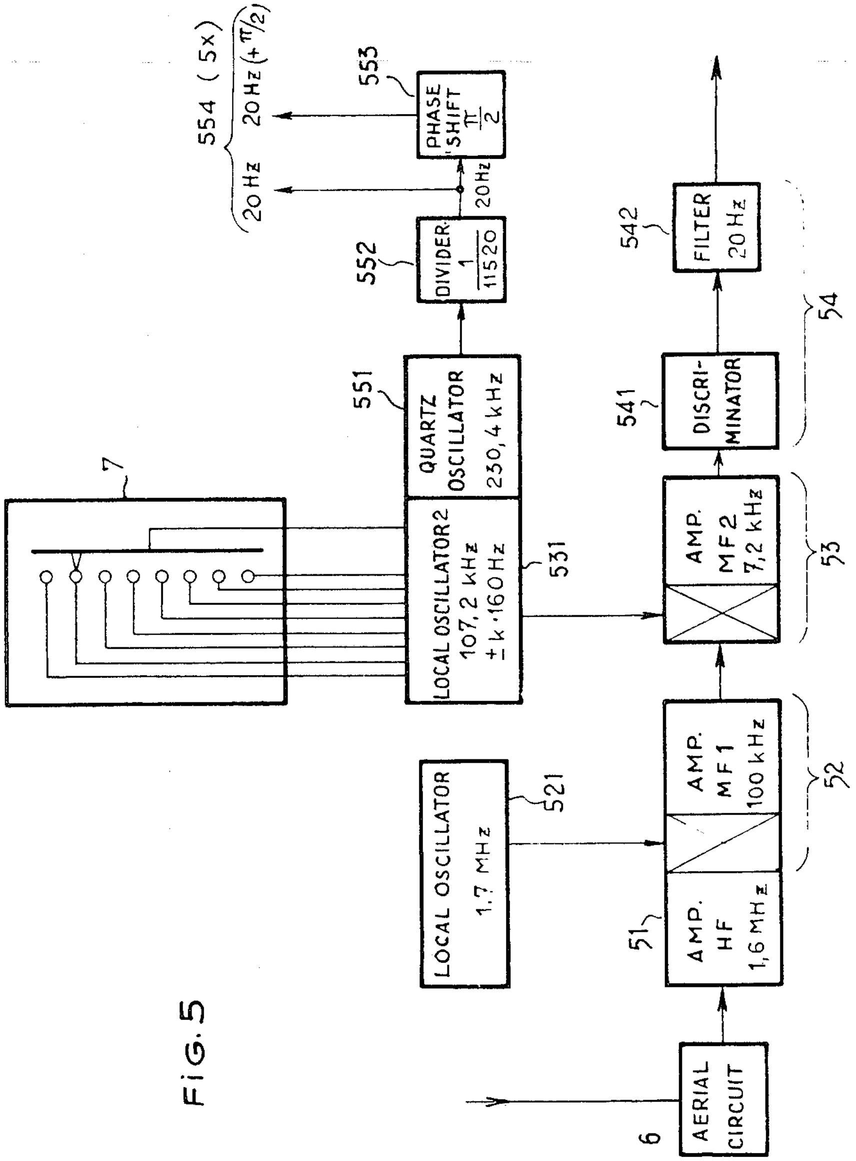

FIG. 3 ia a more detailed circuit diagram of the phase modulator 25 of FIG. 1;

FIG. 4 is a general circuit diagram of a correction receiving apparatus associated with a conventional receiver of the radionavigation system, comprising means for applying corrections to the phase information supplied by the conventional receiver;

FIG. 5 is a more detailed circuit diagram of the receiving and demodulating circuits 51 to 54 of FIG. 4, and FIG. 6 is a more detailed circuit diagram of a channel of the synchronous detector 55 and of the circuit 56 of FIG. 4 for adding corrections.

In the course of the present detailed description, it will be considered that the radionavigation system forming the subject of a differential mode of operation is the OMEGA system.

For the differential mode of operation, only the radionavigation wave which is conventionally the subject of the finest measurement gives rise to the development or preparation of corrections and transmission of these corrections. In the following, therefore, only the transmission of this wave of the radionavigation system will be considered.

It is known that the OMEGA radionavigation system is used most often as a hyperbolic system.

However, the oscillators of the base transmitting stations of the OMEGA system have very great stability. The radionavigation receivers suitable for the OMEGA system and provided with a pilot oscillator of very great stability can operate in the circular mode.

The differential mode of operation which will now be described is designed to suit a hyperbolic and/or circular mode of radionavigation.

In FIG. 1, there is shown at 1 an OMEGA reference receiver connected to an aerial and adapted to supply electric signals each representing the phase of a transmission, that is to say a wave transmission received from one of the transmitting systems of the OMEGA system.

In the course of the present detailed description, we will confine ourselves to the case in which the reference receiver receives four transmitting stations of the OMEGA system, which will be designated by the letters A to D. It should be undestood that this designation is arbitrary and does not imply any necessary correspondence with the conventional letter designations of the OMEGA system.

The receiver 1 compises an oscillator of very great stability compatible with operation in the circular mode. It is also adapted to supply on a plurality of separate lines synchronization signals with respect to the succession of the transmissions of the base stations of the OMEGA system which it receives, which will be called OMEGA format signals.

Four of these format signals (A, B, C, D) are representative of the respective transmission time intervals of the four stations A, B, C and D received. The fifth format signal R is representative of a time interval disconnected from all the others and which corresponds, for example, to the transmission of a station of the radionavigation system which is not received.

The measured phase information available at the output of the receiver 1 is designated by the general reference $\phi_M$ and comprises, for the transmitting stations A, B, C and D, the items of phase information $\phi_{MA}$, $\phi_{MB}$, $\phi_{MC}$, $\phi_{MD}$. The OMEGA reference receiver 1 also supplies reference phase information $\phi_R$ relating to the phase of its very stable oscillator and expressed in electrical form in the same manner as the measured phase $\phi_M$.

The items of phase information $\phi_M$ and $\phi_R$ are expressed in analogue form, for example in the form of a signal having a frequency of about 1 kc/s. The relative difference in phase of two of the signals $\phi_M$ represents the difference in phase of waves as received from the correspondng transmitting stations.

In the same way, the difference in phase of one of the signals $\phi_M$ with respect to the reference signal $\phi_R$ represents the phase on reception of the wave oiginating from the corresponding transmitting station, since the signal $\phi_R$ is a phase reference.

The phase signals $\phi_M$ and $\phi_R$ are sent to a modulating coding circuit having the general reference 2. This modulating coding circuit also receives via a pluality of format synchronization lines, electric signals representing the five segments of the OMEGA system which are utilized by the reference receiver 1, namely four segments A, B, C, D which correspond to the base transmitting stations used by the receiver 1, and the segment R which advantageously corresponds to the transmission of a base transmitting station which is not utilized. The format lines are, for example, five in number, each associated with one of the segments, and adapted to supply two different signals according to whether the associated segment is in process of transmission or not. Of course, only one of the five lines indicates a transmission segment at the same time.

Finally, the reference receiver 1 supplies a clock signal of high frequency, for example 100 kHz, this signal being related in frequency and phase with the reference signal $\phi_R$.

The modulating coding circuit moreover receives theoretical items of phase information designated by the general reference $\phi_O$, originating from display means (not shown) adapted to supply chosen values of these theoretical phases.

The theoretical phases are established for each correction transmitting station as a function of the known positions of the base transmitting stations concerned by these corrections, and of the known position of the said correction transmitting station in the geographical radionavigation area. It has been stated hereinbefore that the operation of radionavigation systems is effected in accordance with theoretical conventions on the propagation of waves. The choice of the theoretical phases $\phi_O$ is made in principle on the setting up of the fixed correction transmitting station, taking account of the same operation conventions.

The measured phase signals $\phi_M$ and the theoretical phase signals $\phi_O$ are applied to a phase correction preparing circuit 21, in which the phase corrections are obtained in the form of analogue signals having a frequency of 1 kHz, by difference between a measured phase signal $\phi_M$ and the theoretical phase signal $\phi_O$ which are associated with the same base transmitting station.

This phase difference can be obtained in many ways. In a very advantageous method of carrying this into effect, the measured phase signals $\phi_M$ are applied to respective phase shifters mechanically driven fast with wheels for mechanically displaying the respectively associated theoretical phases $\phi_O$.

In this way, phase correction signals are available at the four upper outputs of the circuit 21. These phase correction signals $\phi_C$ are out of phase with respect to the associated measured phase signals $\phi_M$, respectively in accordance with the theoretical phases $\phi_O$.

The relative phase displacement of any two of the correction signals $\phi_C$ is therefore equal to the relative phase displacement of the two associated measured phase signals $\phi_M$ reduced by the difference of phase between the corresponding displayed theoretical phases $\phi_O$. It is therefore apparent that the phase correction signals $\phi_C$ and the phase measurement signals $\phi_M$ represent phase information in the same manner, in other words in accordance with the same analogue coding.

Moreover, the phase correction signals $\phi_C$ also represent phase corrections associated with each base transmitting station utilized, by their phase displacement with respect to the reference phase signal $\phi_R$. In FIG. 1, the reference phase signal $\phi_R$ is shown as passing through the circuit 21, although, it is not the subject of any modification therein.

It will be observed that, if any reference signal $\phi_R$ is not transmitted, that is to say when it is not desirable to provide operation in circular mode, the theoretical phases $\phi_O$ can be displayed not in the form of theoretical phases of a wave on reception, but in the form of a difference of theoretical phases between two waves on reception. It is therefore possible to eliminate one of the phase shifters of the circuit 21.

The phase correction signals $\phi_C$ and the reference signal $\phi_R$ supplied by the circuit 21 are applied to a multiplexing circuit 22 which also receives the plurality of format lines. The multiplexing circuit 22 responds to the signals representing the presence of a transmission on one of the segments A, B, C, D, R to supply at its output the phase correction signal $\phi_C$ of the corresponding transmitting station for the first four of these segments, or the reference signal $\phi_R$ for the fifth of these segments. To this end, it comprises a plurality of controlled switches.

The output signal of the multiplexing circuit 22 is therefore a 1 kHz signal which comprises, in sequential and synchronous manner, OMEGA formats, the phase corrections $\phi_C$ and the reference signal $\phi_R$, all in accordance with the same analogue phase coding.

The multiplex signal supplied at the output of the circuit 22 is applied to a frequency transposing or changing circuit 23, which receives as heterodyne signal a signal derived from the 100 kHz clock signal after frequency division in a frequency dividing circuit 24, so that the heterodyne frequency applied to the circuit 23 may be substantially equal to 980 Hz.

The dividing circuit 24 receives a clock signal which is advantageously of the pulse type and comprises numerical dividers for supplying the desired frequency. The outputs of these numerical dividers are put into the form of square signals to obtain the heterodyne signal.

It is very advantageous that the clock signal be in freuency and phase relation with the reference signal $\phi_R$, which can easily be obtained by deriving these two signals from the same very stable freuency source in the reference receiver 1.

The output of the transposing circuit 23 supplies a multiplex 20 Hz signal.

This multiplex 20 Hz signal is used to modulate a carrier wave which is transmitted for a fraction of the geographical area concerned by the base radionavigation system. It has been stated hereinbefore that the corrections determined at a fixed point could be used in the vicinity of this point and up to a certain distance depending on the particular characteristics of the radionavigation system. A knowledge of this distance enables the range of transmission of the phase corrections to be chosen.

According to an advantageous method of carrying out the transmission of the corrections, the modulation of the carrier wave by the 20 Hz multiplex correction signal supplied by the transposing circuit 23 is effected in a modulating circuit 25 and is a phase modulation of low modulation index, of the order of 0.8, which will now be described with reference to FIGS. 2 and 3.

This phase modulation is advantageously obtained from a pilot oscillator 251, the frequency of which, designated by the reference *FO*, is that of the carrier wave of the multiplex phase correction signal.

The frequency signal F*o* is transmitted to a frequency divider 252 dividing by eight, which therefore supplies a frequency signal F*o*/8.

This frequency signal F*o*/8 is applied on the one hand to a phase shifter 253 of 90 electric degrees at the frequency Fo, and, on the other hand, to a circuit 254.

The 20 Hz multiplex signal coming from the transposing circuit 23 is applied, at the input of the modulating circuit 25, to a filter 255 centred on 20 Hz. (The filter 255 could also be regarded as forming part of the transposing circuit 23).

The output signals of the filter 255 are applied as modulating signal to an amplitude modulator without a carrier or amplitude multiplier 256, which receives as signal to be modulated the quadrature signal available at the output of the phase shifter 253.

The quadrature component F*o*/8 modulated in this way which is available at the output of the amplitude multiplier 256 is also transmitted to the circuit 254, which makes a balanced addition of the modulated quadrature component F*o*/8 and the component F*o*/8 which is not shifted in phase and unmodulated coming directly from the circuit 252.

Figure 2:
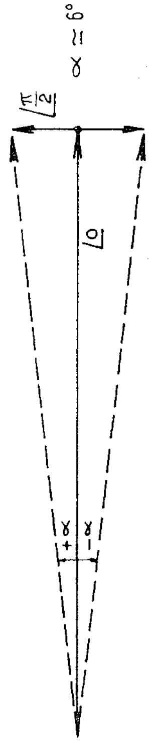
FIG. 2 is a vector diagram illustrating the principle of the phase modulation performed in the apparatus of FIG. 1.

As shown in FIG. 2, the balanced addition is such that the ratio of the modulated quadrature component to the unmodulated component is of the order of 0.1. By vectorial composition, the result obtained is an angle of modulation in phase of the order of 6°. It will be observed that the final result of the multiplication in amplitude of a quadrature component, followed by a balanced addition with a component not shifted in phase, is regarded as a modulation in phase allowing that the quadrature component as shown in FIG. 2 can be assimilated to a circular arc the radius of which would be the component not shifted in phase.

The signal modulated in phase available at the output of the circuit 254 is then the subject of a multiplication of frequeny by 8, which compises a putting into the form of square signals in a circuit 257, a relative amplification of the harmonic 8 with respect to the adjacent harmonics by means of a monostable circuit 258 having a factor of from 7/16 at the frequency F*o*/8 (which corresponds, for the said monostable, to a pulse duration which will be determined easily by knowing the frequency Fo), and a selective filtering at the frequency Fo by the filter 259.

The output of the filter 259, which is the output of the modulating circuit 25, supplies a sinusoidal carrier wave modulated in phase in accordance with the multiplex phase corrections, which is applied to the transmitting circuit 3 of FIG. 1.

The Applicants have obtained excellent results as regards the quality of transmission of the phase corrections by means of the multiplexing circuit, the transposing circuit and the modulating circuit which have just been described. In the case of the OMEGA system, the precision obtained in differential mode by means of the transmission circuits according to the invention is improved in a ratio extending from 3 to 5 relative to conventional operation of the OMEGA system.

It is clear that the transmission of the phase corrections for the purpose of operation in differential mode must be made with very great fidelity. It is necessary to observe in this regard that, in accordance with prior art, this transmission is effected with a broad spectrum for each correction signal. The Applicants have obseved that it is preferable to effect a transmission of these corrections in multiplex form with a narrow spectrum, provided that the carrier wave is modulated by these multiplex phase correction with a very good linearity.

Although other types of modulation of the carrier wave can be used without departing from the scope of the present invention, it is certain that the phase modulation of low modulation index as just described with reference to FIGS. 2 and 3 has a beneficial effect on the quality of the transmissions of the phase corrections.

The advantage of a phase modulation with a narrow modulation spectrum can be explained in particular in the following manner: this narrow spectrum is sufficiently distant from the frequency of the associated carrier wave to avoid practically speaking the appearance of substantial phase errors by reason of the phenomenon known by the name of attenuation (or fading).

From another angle, as will be seen hereinafter, this permits the provision of a chain of correction transmitting stations the respective carrier waves of which have close frequencies, while preserving a sufficient separation between the transmissions of the stations in the chain.

The carrier wave of the multiplex correction signals which are available at the output of the modulating coding circuit 2 is applied to a transmitter 3 comprising a transmitting aerial. As the modulating signal has a frequency equal to 20 Hz, the spectrum energy of the transmission is concentrated essenially on the carrier and these two side bands of ± 16 Hz, that is to say 20 Hz × 0.8 which is the resultant modulation index.

In the case where several correction transmitting stations are used, these stations are constructed in exactly the same manner, except as regards the base transmitting stations received by the OMEGA reference receiver (which base stations may be chosen in manner known per se), the values of the theoretical phases displayed for the modulating coding circuit, and the frequency of the carrier wave of the 20 Hz multiplex correction signals. As indicated hereinbefore, the band width necessary for each correction carrier wave is less than 40 Hz. It is therefore possible to bring the frequencies of the corretion carrier waves very close. The Applicants have obtained excellent results with carrier waves separated by 150 Hz.

A phase correction transmission network comprising some ten correction transmitting stations would therefore occupy a spectrum of about 1.5 kHz, which, for frequencies of the order of a megacycle, constitues a single allocation of frequencies.

Thee will now be described with reference to FIGS. 4 to 6 a mobile receiver for the OMEGA radio navigation system which is designed to operate also in circular mode and comprises a correction receiving circuit according to the present invention.

In FIG. 4, a circular-mode OMEGA receiver 4 comprises, in manner known per se, circuits 41 for receiving the waves of the base stations of the OMEGA system and adapted to supply signals for phases measured on waves received from these base stations and corresponding to the finest measurement, and also to supply a reference signal drawn from the very stable clock belonging to the receiver 4. In the event of the receiver 4 not being designed to operate in circular mode, this reference signal can be eliminated.

The coding of the phase and reference information may be of any type, analogue or dgital; to clarify the description, it will be assumed that this coding is analogue and of the same type as that of the OMEGA receiver 1 used for the correction tramsitting station.

The receiver 4 of FIG. 4 also comprises in manner known pe se a time base adapted to supply signals representing five transmission segmens of the OMEGA format, four of which are associated with the base transmitting stations A, B, C, D forming the subject of correction transmission and the fifth of which is the reference segment R of the correction transmitting stations. It will be assumed that the receiver 4 of FIG. 4 is allotted to the same base transmitting stations as are associated with the correction transmitting station used.

It will be observed that this is not absolutely necessary, because the choice of the segments A, B, C, D, that is to say of the base stations which are the subject of a phase correction transmission, depends solely on the OMEGA receivers associated with the circuits of the present invention, both in the correction transmission stage and in that of reception of these corrections.

In fact, as will be seen hereinafter, at the level of the correction receiver, only the phase corrections associated with the segments used by the receiver 4 are reconstituted. The correction receiver must therefore receive a correction transmitting station which transmits corrections at least for all the base stations used in the conventional receiver 4.

Assuming that the correction transmitting stations supply corrections for all the transmitting stations of the base network (which is difficult to achieve in the case of the OMEGA system), it is apparent that the format lines leaving the time base 42 of the receiver 4 permit automatic selection of the corrections associated with the base transmitting stations chosen at the level of the receiver 4.

In the case of the OMEGA system, only a part of the base stations is generally used for a given navigation zone. This is why the number of base stations which are the subject of a correction transmission according to the present invention is equal to four.

The receiver 4 also comprises devices 43 for displaying the measured phases.

It is known that in conventional operation that is to say non-differential operation, of the receiver 4 of FIG. 4, the items of phase information of the receiving circuit 41 are transmitted directly to the display circuit 43.

According to the present invention, a phase correction is effected before display in the device 43. It is considered as being accessible to those skilled in the art to modify the internal connections of the receiver 4 accordingly.

FIG. 4 also shows a correction receiving circuit 5 receiving signs from an aerial circuit 6. The correction circuit 5 also receives a command signal for selection of the correction transmitting stations which originates from a change-over switch 7 shown diagrammatically in FIG. 4.

According to the illustration of FIG. 4, the number of correction transmitting stations is equal to eight. Of course, the pass band of the aerial circuit 6 and of the input circuits of the correction receiving circuit 5 is chosen according to the number of correction transmitting stations which can be received and the pass band of the transmission of each of these stations.

Another advantage of the small transmission spectrum width of the correction stations becomes immediately apparent; in fact, it is possible to receive a high number of correction transmitting stations with the aid of the same receiving stages.

In FIGS. 4 and 5, the correction receiving circuit 5 comprises a high-frequency amplifier 51 with a wide band centred on 1.6 MHz which is adapted to amplify all the carrier waves of the network of correction transmitting stations. This high-frequency stage 51 is followed by a first frequency changing stage 52 comprising a first local oscillator 521 having a fixed frequency of 1.7 MHz and quartz driven. The pass band of the first frequency changing stage 52 is adjusted around 100 kHz in order that this stage may allow to pass only the total spectrum of all the adjacent carrier wave of the network of correction transmitting stations, while eliminating image frequencies.

The output signals of the first frequency changing stage 52 are applied to a second frequency changing stage 53, of which the pass band around 7.2 kHz is chosen practically rectangular and equal to 40 Hz while the second associated local oscillator 531 has a stable frequency of 107.2 kHz ± k.160Hz switchable instantaneously in controlled manner by means of a synthetiser. The second frequency changing stage must be adapted with a pass band sufficiently rectangular to ensure good lateral rejection, without therby affecting the phase of the signals transmitted.

The output of the second frequency changing stage is applied to a demodulator 54, the structure of which depends on the type of modulation of the correction carrier waves. In the case of a phase modulation of low modulation index, the demodulator is a phase discriminator 541, which may be of any known type, followed by a filter 542 centred on 20 Hz.

The output of the demodulator 54 is applied to a separating circuit 55 receiving the five segments of OMEGA format and supplying at separate outputs the phase correction signals $\phi_C$ in the form of continuous signals representing phase corrections.

There will now be described a phase correction channel of the separating circuit 55 and of the correction addition circuit 56. FIG. 4 illustrates the separating circuit 55 by means of controlled switches for purposes of illustration; as will now be seen, this circuit is in fact advantageously constructed to effect at the same time as the demultiplexing a synchronous detection demodulation of the 20 Hz phase correction signals.

In FIG. 5, a quartz oscillator 551 supplies a frequency of 230.4 kHz which is the subject of a division by 11,520 in a frequency dividing circuit 552, supplying a 20 Hz reference signal. Another 20 Hz signal in phase quadrature with respect to the first-mentioned signal is supplied by a phase shifter 553.

The output of the filter 542 is applied to a plurality of synchronous detetors 554, only one of which is shown in FIG. 6. These synchronous detectors, of which there are five, receive from the time base 42 of the conventional receiver 4 the five segments A, B, C, D, R of the OMEGA format, respectively.

In each synchronous detector such as 554, the synchronous detection is effected in response to the associated segment. Each synchronous detector therefore treats a 20 Hz signal associated with a single phase correction, which produces the demultiplexing.

The synchronous detectors such as 554 receive the 20 Hz signals not shifted in phase and in quadrature to achieve the synchronous detection in manner known pe se and to each supply two continuous signals representing the sine and cosine of the phase correction to be effected.

The signals available at the output of the circuit 554, which are present only during the associated segment A, are the subject of an integration filtering with a high time constant in the circuit 555, which makes them permanent. This implies that the synchronous detector 554 is of the type supplying a zero output in the absence of a commond signal such as the segment A. As regards the high time constant filtering, the problem is the same as for the conventional reception of sequential radionavigation systems and, consequently, easy to solve for those skilled in the art.

The permanent sine and cosine signals of the phase correction which are available at the output of the integrating filter 555 are applied to phase shifter 56, which receives the measured-phase signal for the base transmitting station A originating from the circuit 41.

In one embodiment, the measured phase signals are 1 kHz signals similarly modulated in phase in accodance with the respectively associated measured phases, and the phase shifter 56 is an electronic sine and cosine control phase shifer.

The output of each phase shifter such as 56 is a 1 kHz signal modulated in phase in accordance with the corrected phase. It will be observed that the phase relations existing throughout the correction information transmission chain between the phase signals associated with base transmitting stations and beween these same signals and the reference phase signal are preserved. This is important in order that the phase differences obtained after corrections may be usable in hyperbolic mode.

In circular mode, the reference signal of the receiver 4, which is not normally strictly in phase with the reference signal of the correction transmitting station, is also the subject of a phase correction before operation.

The corrected items of information are supplied to the display circuit 43 for continuous display of each measured phase after correction in differential mode.

It has been assumed, on the one hand in the correction transmitting station and, on the other hand, for each mobile receiver, that the receiving circuit 41 supplies phase information continuously for each transmitting station, and that the display circuit 43 is designed to give a visual display of the continuous information, whereas the OMEGA radionavigation system is of the sequential type At the level of the correction transmitting station, the phase information supplied by the receiver 1 may be sequential.

Of course, it is also possible on reception to cause the storage function to intervene, giving these items of phase information their continuous character only at the level of the display circuit 43. Under these conditions, the correction addition circuit may be differently designed.

The embodiments of the invention in which an exclusive property or privilege is claimed are defined as follows:

1. A method of transmitting phase corrections in a sequential-transmission phase measurement radionavigation system, comprising at a correction transmitting station, generating a plurality of phase correction signals repectively associated with selected sequential transmissions, and transmitting the phase corrections and at a conventional receiver of said radio-navigation system, receiving said phase corrections for applying them to measured-phase signals associated with said selected transmissions and supplied by said conventional receiver, wherein the improvement comprises:
  at said correction transmitting station, multiplexing said phase correction signals, the multiplex frequency being between 10 and 30 times the repetition rate associated with the average duration of the individual transmissions of the radionavigation system, said multiplexing being synchronous with the sequence of said selected transmissions, and modulating a carrier wave with said multiplexed phase correction signal; and
  at said conventional receiver, receiving and denodulating said carrier wave, and demultiplexing said multiplex phase correction signal in a manner synchronous with the sequence of reception of said selected transmissions by said conventional receiver, to provide separate correction signals associated with said seleted transmissions and similarly modulated in phase in accordance with the corrections to be applied.

2. method of transmission according to claim 1 wherein said modulation is a low modulation index phase modulation.

3. A method of transmission according to claim 2 wherein said low-index phase modulation comprises:
  generating two sinusoidal signals the frequency of which is equal to one eighth of that of the said carrier wave, said signals being displaced in phase by a quarter of a period with respect to each other; multiplying in amplitude one of these signals by said multiplex modulation signal; adding in a balanced adder the other of said signals and said multiplied signal, the ratio of the maximum amplitude of said multiplied signal to said other signal being of the order of 0.1; and multiplying the frequency of the signal obtained after said balanced addition by 8.

4. A method of transmission according to claim 1 including at said conventional receiver synchronously detecting said separate phase correction signals to provide continuous signals representing the phase corrections to be applied.

5. A method of transmission according to claim 1 entailing a plurality of correction transmitting stations, wherein the frequency of said multiplexed phase correction signal is the same for all said transmitting stations, and the frequencies of the respective carrier waves of the stations differ from one another by the same amount which is between about 5 and about 10 times said frequency of said multiplex phase correction signal.

6. In a phase correction transmitting station for a sequential-transmission phase measurement radio-navigation system, comprising a system receiver to provide a plurality of measured-phase signals having the same frequency and modulated in phase in accordance with the measured phase which is respectively associated with them, and synchronisation information relative to the sequence of the corresponding transmissions, a modulating coding circuit for use with a transmission circuit for effecting a phase correction transmission, said modulating coding circuit comprising:

- a plurality of preset phase shifters adapted to shift the phase of said measured phase signals in accordance with respectively preset values to supply phase correction signals;
- a multiplexer for receiving said phase correction signals and said synchronisation information to provide a single signal multiplexed in synchronous manner for phase correction of the sequence of associated transmissions;
- a circuit for changing the frequency of the single phase correction signal to provide a multiplexed modulating signal having a frequency between about 10 and about 30 times the repetition rate associated with the average duration of the individual transmissions of the system; and
- a circuit for modulating a carrier wave of frequency F*o* by means of said multiplex modulating signal.

7. Apparatus according to claim 6 wherein said modulating circuit is a low modulation-index phase modulator.

8. Apparatus according to claim 6 in which said modulating circuit comprises a pilot oscillator supplying a sinusoidal signal of frequency equal to one eighth of the frequency F*o* of said carrier wave, a phase modulator modulating said F*o*/8 frequency signal, and a multiplier of the frequency of the output of said phase modulator by 8.

9. Apparatus according to claim 8 wherein said phase modulator comprises a quarter-of-a-period phase shifter for the sinusoidal signal from said pilot oscillator, an amplitude multiplier for the quadrature component obtained in this way, and an adder for the signal supplied by said pilot oscillator and said signal modulated in this way, the ratio of the maximum amplitude of the latter to the maximum amplitude of the former being of the order of 0.1.

10. Apparatus according to claim 9 wherein said frequency multiplier comprises a circuit for shaping the signals of said adding circuit into square signals, followed by a monostable having a seven sixteenths form factor at said frequency F*o*/8.

11. Apparatus according to claim 6 in a correction transmitting station comprising a system receiver equipped with a very stable clock supplying measured-phase signals and a reference phase signal derived from said clock and having the same frequency as said measured-phase signals, as well as a high-frequency signal likewise drawn from the said clock, wherein said multiplexer is arranged to supply said reference phase signal during an interval of time located outside those of said phase correction signals, and said frequency changing circuit receives said high-frequency signal to derive its heterodyne frequency therefrom.

12. Apparatus according to claim 11 wherein said interval of time located outside those of said phase correction signals corresponds to a transmission of the system which is not an object of a phase correction in a manner controlled by the synchronisation information.

13. A phase correction receiver for use with a conventional receiver of a sequential-transmission phase measurement radio-navigation system, which provides measured-phase information and synchronisation information associated with the corresponding transmissions, said phase correction receiver being adapted to receive the carrier wave of a correction transmitting station, said phase correction receiver comprising:

- a circuit for receiving and demodulating said carrier wave; and
- a demultiplexer receiving the demodulated signal and synchronisation information from said conventional receiver, to provide a plurality of phase correction signals similarly modulated in phase in accordance with the respective phase corrections to be effected.

14. Apparatus according to claim 13 comprising for each phase correction signal a demultiplexing and synchronous detection circuit associated with an integrating filter, to provide a continuous signal representing the corresponding phase correction to be effected.

16. Apparatus according to claim 14 for use with a conventional system receiver supplying measured-phase signals in the form of sinusoidal signals the respective phases of which are in linear dependence on the associated measured phases, including for each measured-phase signal a phase shifter controlled by the associated continuous phase correction signal.

16. Apparatus according to claim 13 for use with a conventional receiver equipped with a very stable clock and intended to receive the carrier wave of a correction transmitting station, comprising means for supplying separately from said demodulated signal a correction signal for the phase of the said very stable clock of said conventional receiver with which it is associated with respect to that of the very stable clock of said system receiver located at said correction transmitting station.

17. Apparatus according to claim 13 for receiving selectively the carrier wave of one of a plurality of correction transmitting stations the carrier waves of which are distributed in equidistant fashion in a frequency band, wherein the receiving circuit comprises a wide-band high-frequency amplifier stage, a first frequency changing stage tuned to said frequency band, a second frequency changing stage with a heterodyne frequency adjustable by steps in controlled fashion in accordance with the frequencies of the different carrier waves capable of being received, having an almost rectangular pass band adjusted to the modulation spectrum, and a demodulating stage.

* * * * *

UNITED STATES PATENT OFFICE

CERTIFICATE OF CORRECTION

Patent No. 3,774,211 Dated November 20, 1973

Inventor(s) Georges Nard; Gerard Millot; Christian Lamiraux

It is certified that error appears in the above-identified patent and that said Letters Patent are hereby corrected as shown below:

In the title, line 2, delete "CONNECTIONS" and replace with ---CORRECTIONS---

Signed and sealed this 14th day of May 1974.

(SEAL)
Attest:

EDWARD M.FLETCHER,JR.
Attesting Officer

C. MARSHALL DANN
Commissioner of Patents